United States Patent Office

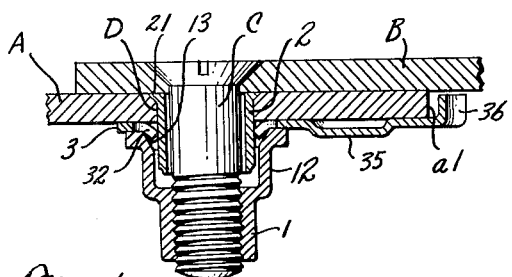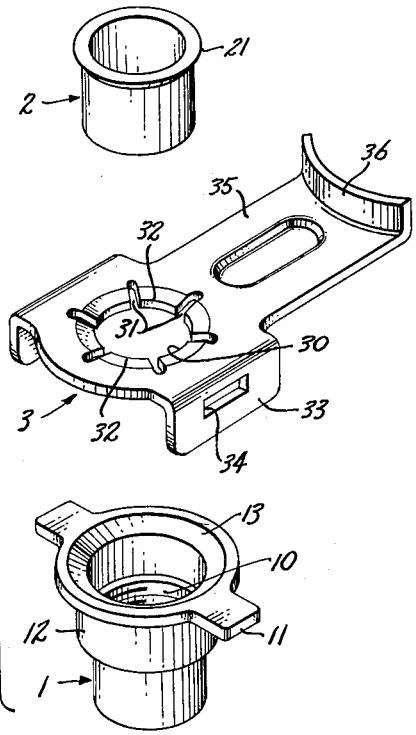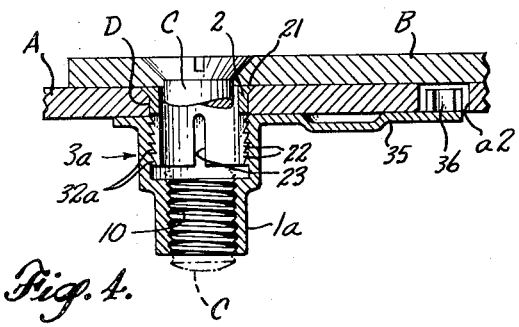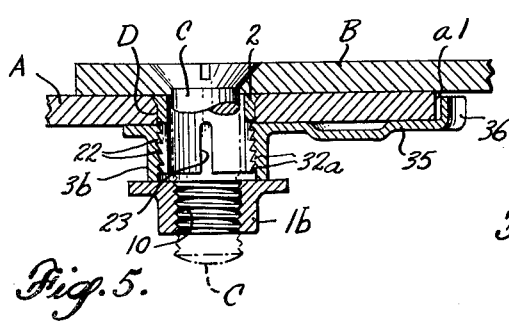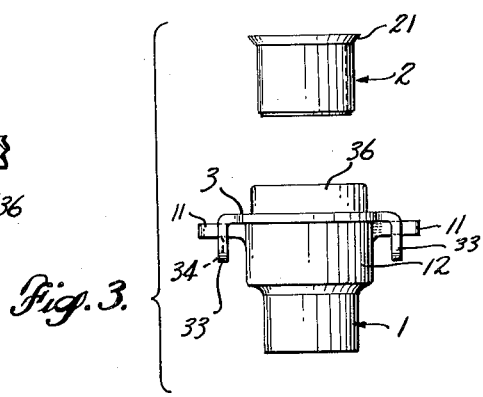
INVENTOR.
RICHARD B. MCKELVEY
BY
Reynolds, Beach & Christensen
ATTORNEYS

3,020,947
Patented Feb. 13, 1962

3,020,947
FASTENER MEANS HAVING SUPPORTING MEANS
TO HOLD NUT ELEMENT TO A WORKPIECE
Richard B. McKelvey, Kirkland, Wash., assignor to
Boeing Airplane Company, Seattle, Wash., a corporation of Delaware
Filed Sept. 8, 1959, Ser. No. 838,493
9 Claims. (Cl. 151—41.75)

This invention relates to an improved type of fastening device, for use with a screw or bolt to secure or mount an instrument upon an instrument panel, or to hold the workpieces or structural elements together. It is especially useful when one face of the work is difficult of access for the use of a nut wrench or like tool and the nut must be previously installed and correctly located at the blind side of the joint.

In some detail, the invention comprises three principal parts, a sleeve headed at one end to engage the inner surface of a first of two or more work pieces to be held together, a cage at the opposite or outer surface of the same work piece, engageable with the exterior of the sleeve, and capable of ratcheting movement axially along the sleeve to engage such opposite surface of said first work piece, and a nut so coupled with the cage that their relative rotation is prevented. The nut eventually receives a bolt the head whereof bears upon the outer surface of the second of the two work pieces, and by its threading within the nut urges the latter and the cage whereon the nut bears tightly against the outer surface of the first work piece, to clamp the two work pieces together. The cage's function is to retain the sleeve preliminarily in place in the first work piece, and thereby to support the cage-supported nut in position for later engagement by the bolt passed through the sleeve and so through the work pieces. The nut being non-rotative relative to the cage, it becomes necessary to fix the cage non-rotatively relative to the first work piece, in order that the bolt may be threaded home. Heretofore the cage, in certain known constructions of this type, has been preliminarily riveted to this work piece, but so doing involves various operations which add to the cost of using such fastening devices, as explained more fully below, and which do not allow for minor inaccuracies in their location. The present invention eliminates the necessity for affixing the cage in any manner to the work piece, while still insuring against rotation of the nut and cage, and so simplifies the installation.

The present invention is an improvement over other known devices of the same general character, which likewise require no affixing of the cage to the work, but which allow not even slight movement of the installed nut laterally, that is, in its own plane, to align with or conform to the axis of the bolt when installed. The present invention does allow some lateral movement of the nut, and does not lock the nut in a rigidly fixed position, as do the known devices referred to. Nevertheless, the nut is preliminarily held to the first work piece in such manner that despite its ability to shift, coaxial engagement of the bolt with a blind or inaccessible nut is readily effected. The flexibility of the present invention in this respect permits minor departures from alignment of the holes for the bolts, and eliminates the greater expense that greater precision would entail.

Usually the nut and the cage are separate, as stated, but in one form they are shown as integral.

Fastening devices of the same general nature and for like purposes are known, but as stated above the present invention has the advantage of lessening the labor, and hence the cost, involved in the installation of the known devices. For example, a currently used plate nut that must be riveted in place requires the following operations: (a) Locate the screw or bolt hole in the structure to which the plate nut is to be attached; (b) drill the bolt hole; (c) locate and coordinate two rivet holes adjacent the bolt hole; (d) drill the two rivet holes; (e) countersink the two rivet holes for flush rivets; (f) bolt or clamp the plate nut in place on the structure; (g) drive rivets in the two rivet holes to secure the nut to the structure; (h) remove the bolt or clamp applied at step (f); (i) inspect the installation of the rivets and plate nut. Where inaccessibility is a factor, for example because of the proximity of other structure, the difficulty and cost of the above increases correspondingly. In contrast, the fastening device of this invention requires only the following operations: (a) Locate the bolt hole in the structure to which the nut is to be attached; (b) drill the hole for a sleeve; (c) countersink the hole to receive the head of the sleeve; (d) insert sleeve within the countersunk hole; (e) press the nut, with its already attached cage, axially onto the sleeve; (f) inspect the nut installation. In either case the nut is now ready to receive a bolt, but in the latter case the critical riveting operation, and locating and drilling the holes therefor, is wholly eliminated. No tools whatever are needed to install the nut, nor are any special tools needed for installation of the bolt, merely a screw driver or a wrench applied to its head end, which can be a manual or a power tool; no tool nor any engagement is needed at its opposite end. This simplifies securement of parts, especially when the opposite end is difficult of access. Additionally, the nut is either accurately aligned in the axial direction to receive the bolt, or can shift laterally to some extent to align itself with the bolt and with the bolt hole in the work, should there be slight misalignment in drilling.

One further object of the invention is to provide a nut and support therefor which can be easily applied to a workpiece, and which will strongly resist forces tending to back it off.

It is also an object of this invention to enable manufacture of the fastening device in a simple hence economical manner.

The invention is shown embodied in several forms in the accompanying drawing, and will be so described herein. The claims define the novel features generically, and also specifically as to each form.

FIGURE 1 is an axial sectional view through a preferred form of fastener, shown with a bolt engaged therewith.

FIGURE 2 is an exploded isometric view of the same, showing the three parts of the fastener separated from one another, and FIGURE 3 is a side elevational view, showing the cage and the nut assembled as they would be prior to installation, and the sleeve separate as it would be prior to installation.

FIGURE 4 is an axial sectional view, similar to FIGURE 1, showing a modified form wherein the cage and the nut are formed as a single unit.

FIGURE 5 is another axial sectional view, showing a further modified form.

The fastener is useful, for example, to secure two structural elements together, or to secure an instrument base upon an instrument panel. The supporting plate is indicated at B, and this may be designated the second work piece, and the supported plate at A which can be designated the first work piece. They are ultimately joined by means of a through bolt C. The fastener is preliminarily installed in a hole D in the workpiece A, after which the bolt C is passed through a hole in the second work piece and then through the oversize hole D and the sleeve installed therein, of a bore size exceeding the diameter of the bolt's shank, to engage the installed nut carried by A, and is threaded home to secure B to A.

The faster comprises the three principal parts respectively the nut 1 interiorly threaded or otherwise formed to receive the threaded end of bolt C, the sleeve 2 of a size externally to fit the hole D and of a bore size to pass the bolt shank C, usually with some clearance all around, and the cage 3. The cage is annular, and in the preferred form of FIGURES 1 to 3 is of resilient sheet metal, and disklike. Being radially slit at 31 about its central hole 30, and being bent downwardly as viewed in FIGURES 1 and 2, its upper inner edge constitutes in effect resilient ratchet teeth 32 which are directed inwardly to engage the exterior surface of the sleeve 2. These teeth need not be turned down, but may be sharp-edged to engage actual ratchet rings or serrations about the sleeve 2. If the sleeve is not serrated, when the cage 3 is urged axially of the sleeve 2 towards the countersink head or flange 21 of the latter, the teeth yield and bend slightly, and their upper inner edges bite into the sleeve in the manner of ratchet teeth. The metal of the sleeve may be sufficiently soft to afford a good bite, or the sleeve may be formed exteriorly with actual ratchet tooth rings, as stated above, and as shown in the forms of FIGURES 4 and 5. The cage teeth 32 will then engage such actual teeth on the sleeve. The axial ratcheting movement between the cage and the sleeve is the result of resilience in the one thereof—in the preferred form of FIGURES 1 to 3, in the metal of the cage.

One reason for preferring the smooth sleeve is that it can be made by a rapid, inexpensive manufacturing process, whereas the formation of teeth upon its exterior introduces additional operations and expense in manufacture. By proper choice of the metal in the sleeve and in the cage, the two can be pressed together at installation in a simple manner and by a simple tool, with slight force, yet they will strongly resist any backing out force likely to be applied during screwing home of the bolt.

The nut 1 is interiorly threaded at 10 to fit the shank of the bolt C. It bears upon the cage to urge the latter in the ratcheting sense when the bolt is threaded into the nut. Since the nut must not rotate at this time, it is so engaged with the cage, and the latter with the workpiece, that rotation is prevented. This can be done in various ways, but by way of example, the cage is formed with downturned ears or lugs 33 having holes 34, wherein are received arms 11 radiating from the nut 1; also, the cage has rotation-preventing stop means such as a torque arm 35 with a shoulder or knob 36 engageable with a nearby shoulder such as an end edge a1 of workpiece A or within a nearby hole a2.

In the form of FIGURES 1 to 3, wherein the cage 3 is disk-like, the nut 1 is formed with a skirt 12 that surrounds but does not engage the projecting end of sleeve 2, and bears against the cage 3 about the root circle of ratchet teeth 32. The skirt may be interiorly chamfered, at 13, to afford space for the bending of the teeth; see FIGURES 1 and 2.

The cage and the nut may constitute a single unit, if the resilience for ratcheting is provided otherwise than as described above. In FIGURE 4, nut 1a and cage 3a are so formed. Here circumferential ratchet teeth 32a axially spaced along the interior of cage 3a engage complemental ratchet teeth 22 on the exterior of the sleeve 2. Resilience is afforded by axially directed slits 23 extending from the end of the sleeve opposite its head 21, towards the headed end, the sleeve being then necessarily of resilient metal.

The use of a series of interengageable ratchet teeth 22 and 32a is possible even if the nut 1b and cage 3b are separate, but the latter is not disk-like, nor resilient. Resilience is afforded by the slits 23. Such a form is shown in FIGURE 5.

A further advantageous provision in the forms of FIGURES 1 to 3 and 5, especially resides in the lateral float of the nut's axis relative to the axis of sleeve 2 which can be attained by making the holes 34 oversize relative to the arms 11 received therein. By so doing the nut 1 or 1b may shift transversely in its own plane, that is, in the direction at right angles to FIGURE 3, as well as transversely in the direction of the plane of the drawing sheet in that figure, thus enabling the nut to come into alignment with the screw C even though the holes in A and B are not exactly aligned. The same result can not be attained in the same way in the form of FIGURE 4, but is unnecessary, since here the nut 1a is necessarily aligned with the cage 3a, being integral therewith, and hence is aligned with the sleeve 2 upon which the cage is mounted.

The fastener is installed in the first workpiece A. This is drilled at D, oversize of the bolt C, and large enough to snugly receive sleeve 2. One surface is countersunk so head 21 will be flush when the sleeve is inserted. The nut 1 and cage 3, previously assembled as in FIGURE 3 and held by interengagement of arms 11 with lugs 33, although shown separately for clearness in FIGURE 2, are now merely pressed with but slight force onto the projecting end of sleeve 2, the teeth 32 ratcheting over the exterior of the sleeve, and the first workpiece A is now ready for securement to the second workpiece B. The latter is drilled to the size of bolt shank C, and countersunk if required. This hole in B is placed in registry with sleeve 2, and bolt C is passed through, engaging nut 1, already in place. If the holes in A and B are not precisely aligned, the nut in the forms of FIGURES 1 to 3 and 5 can float laterally into alignment. By engaging the head of bolt C it is turned, and threaded home in nut 1. Its rotation will tend to rotate nut 1, but the arms 11 in cage 3, and the shouldered torque arm 35 or other stop means engaged with some part of the work, prevent such rotation. When the bolt is threaded fully home, the nut bearing against the cage urges the latter in the ratcheting sense along the sleeve. All parts are securely held, and there is no need to have access to the under side of workpiece A. No special tool is needed, and installation is a simple, quick job. The grip between teeth 31 and sleeve 2 is sufficiently resistant that even when quite appreciable axial pressure is used, as by a power drill applied to a recessed head screw, there is no backing off.

I claim as my invention:

1. A fastening device for engagement with a cooperating headed bolt to secure together two work pieces which have approximately aligned holes, comprising a sleeve of an internal diameter somewhat exceeding the diameter of the shank of the bolt which is to be used, said sleeve being headed at one end for engagement with one face of a first work piece when passed through the hole in such first work piece, a cage separate from and which in use surrounds the end of said sleeve opposite its head, and engages the opposite face of the first work piece, of the sleeve and the cage at least one having ratchet teeth for ratcheting engagement with the cooperating portion of the other, as the cage is pressed axially towards the headed end of the sleeve, a stop means carried by the cage and located for engagement with a complemental stop means upon the first work piece, to restrain rotative movement of the cage, a nut for engagement by the bolt when the latter is inserted through the hole in the second work piece and through said sleeve, and a connection between said cage and said nut arranged to prevent their relative rotation, the nut hence being held from rotation by the stop means, and the nut when threaded onto the bolt urging the cage in the ratcheting sense, by reaction from the head of the bolt engaging the distant face of the second work piece.

2. A fastening device as in claim 1, wherein the cage and nut are unitary, the cage and the sleeve being formed with cooperating ratchet teeth, and one thereof being of resilient material longitudinally slit from its end, for yielding to allow ratcheting movement of the cage along the sleeve.

3. A fastening device as in claim 1, wherein the cage is of resilient material and of annular disk-like form, radially slit at intervals around its inner periphery to define a plurality of ratchet teeth for engagement with the sleeve.

4. A fastening device as in claim 3, wherein the sleeve is externally smooth, and of metal sufficiently soft relative to the cage teeth that such teeth engage the sleeve against disengagement of the sleeve and cage.

5. A fastening device as in claim 4, including a skirt formed on the nut and enclosing the end of the sleeve which is distant from its head, and bearing upon the cage about the root circle of the teeth, the teeth being inclined from such root circle away from the head of the sleeve, to engage the exterior of the sleeve by their inner corner nearer the head.

6. A fastening device as in claim 5, wherein the skirt is chamfered beneath the inclined teeth.

7. A three-part fastening device for engagement with a cooperating headed bolt, to hold two work pieces together, comprising a sleeve, a cage, and a nut; a head at one end of said sleeve to engage a surface of a first work piece, the sleeve being of a length to project beyond the opposite surface of such work piece, and of a bore size somewhat exceeding the shank diameter of the bolt; said cage having an aperture of a size to fit snugly about the projecting end of the sleeve, of the sleeve and cage at least one having flexible ratchet teeth engageable with the complemental portion of the other for relative axial ratcheting movement to engage the cage with the surface of the first work piece opposite the surface with which the sleeve's head engages, and to restrain opposite relative movement, a torque arm projecting radially from said cage, and shouldered outwardly of the cage for engagement with a complemental shoulder of the work piece, to prevent its rotation; connecting means between the nut and the cage to prevent substantial relative rotation and their relative axial movement, and to retain the nut substantially in alignment with the cage and hence with the sleeve, for threaded engagement between the nut and the bolt when the bolt is passed through a hole in the second work piece and through the sleeve in the first work piece, thereby to urge the cage and the head of the bolt against opposite surfaces of the two work pieces by ratcheting movement of the cage along the sleeve.

8. A fastening device as in claim 7, wherein the nut and the cage are separate pieces, radial arms formed on one thereof and the other having apertured lugs receiving said arms, constituting the means connecting the cage and nut to maintain the two in nonrotative arrangement.

9. A fastening device as in claim 8, wherein the cage is of disk-like form, having downturned apertured lugs, and radially directed arms on the nut received in such apertures, constituting the rotation-restraining means.

References Cited in the file of this patent

UNITED STATES PATENTS

| | | |
|---|---|---|
| 2,111,267 | Hoppenstaud | Aug. 15, 1938 |
| 2,168,721 | Tinnerman | Aug. 8, 1939 |
| 2,335,205 | Zepp | Nov. 23, 1943 |
| 2,390,752 | Tinnerman | Dec. 11, 1945 |